(12) United States Patent
Meharry et al.

(10) Patent No.: US 7,633,435 B2
(45) Date of Patent: Dec. 15, 2009

(54) DUPLEXER FOR SIMULTANEOUS TRANSMIT AND RECEIVE RADAR SYSTEMS

(75) Inventors: David E. Meharry, Lexington, MA (US); Stephen A. Hedges, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 443 days.

(21) Appl. No.: 11/579,369

(22) PCT Filed: Aug. 8, 2005

(86) PCT No.: PCT/US2005/028154

§ 371 (c)(1),
(2), (4) Date: Nov. 2, 2006

(87) PCT Pub. No.: WO2006/023319

PCT Pub. Date: Mar. 2, 2006

(65) Prior Publication Data

US 2008/0272959 A1    Nov. 6, 2008

Related U.S. Application Data

(60) Provisional application No. 60/603,908, filed on Aug. 24, 2004.

(51) Int. Cl.
G01S 13/00 (2006.01)

(52) U.S. Cl. .................. 342/198; 342/175; 455/83

(58) Field of Classification Search .......... 342/174, 342/175, 198; 455/78, 83
See application file for complete search history.

(56) References Cited

U.S. PATENT DOCUMENTS

| | | | |
|---|---|---|---|
| 3,021,521 A | 2/1962 | Hutchins | |
| 4,968,967 A | 11/1990 | Stove | |
| 5,010,557 A | 4/1991 | Chun | |
| 5,534,829 A | 7/1996 | Kobayashi et al. | |
| 5,835,848 A * | 11/1998 | Bi et al. | 455/24 |
| 6,618,002 B1 | 9/2003 | Perry | |
| 6,704,349 B1 * | 3/2004 | Masenten | 375/219 |
| 6,721,544 B1 | 4/2004 | Franca-Neto | |
| 6,784,759 B2 | 8/2004 | Maekawa et al. | |
| 6,795,690 B2 | 9/2004 | Weissman et al. | |

* cited by examiner

*Primary Examiner*—Ian J Lobo
(74) *Attorney, Agent, or Firm*—Sand & Sebolt; Michael Sand; Daniel J. Long

(57) ABSTRACT

An enhanced duplexer (1) which includes a combination of high dynamic range (HDR) amplifiers (11, 17) and a naovel signal cancellation circuit topology (15). Return signals from the circulator (3) are fed into the first HDR amplifier (11). A portion of the transmit signal is sampled with a directional coupler (7) and amplified with a second HDR amplifier (17) and then combined with the output of the first HDR amplifier (11) using a second directional coupler (13). The gain and phase of the second io amplifier (17) are adjusted so the leakage signals are canceled (19, 21) to enable a radar system to simultaneously transmit and receive signals to and from an antenna with increased sensitivity of operation.

16 Claims, 5 Drawing Sheets

DUPLEXER FOR SIMULTANEOUS TRANSMIT AND RECEIVE RADAR SYSTEMS

CROSS REFERENCE TO RELATED APPLICATION

This application claims rights under 35 USC 119(e) from U.S. application Ser. No. 60/603,908, filed Aug. 24, 2004; the contents of which are incorporated herein by reference.

BACKGROUND OF THE INVENTION

1. Technical Field

The present invention relates to antennae and receivers and more particularly to duplexers used in radar systems for simultaneously transmitting and receiving signals to and from an antenna. Even more particularly, the invention relates to the use of high dynamic range low noise amplifiers in combination with directional couplers of a cancellation circuit to cancel leakage signals in order to provide greater sensitivity of operation of the radar system.

2. Background Information

In radar apparatus, duplexers isolate the receiver from the transmitter while permitting them to share a common antenna. A duplexer is designed for operation in the frequency band used by the receiver and transmitter, and must be capable of handling the output power of the transmitter. The duplexer must provide adequate rejection of transmitter noise occurring at the receive frequency, and must be designed to operate at, or less than, the frequency separation between the transmitter and receiver, and must provide sufficient isolation to prevent receiver desensitization. Heretofore, this technology has been limited by an inability of duplexers in transmit/receive modules to allow simultaneous transmit and receive. Transmit leakage through isolation and antenna port reflection paths as well as mutual coupling from adjacent antenna elements in a phased array, overloads the first amplifier stage in the receive path.

This problem has been recognized in the past and has been attempted to be corrected by various types of cancellation circuits such as described in U.S. Pat. No. 3,021,521. The apparatus of this patent solves some of these problems. However, it completely cancels the receive signals near the transmit frequency so that simultaneous operation is not possible. It also may have possessed additional shortcomings which are discussed in detail in U.S. Pat. No. 4,968,967 which discloses a radar system which solves many of the problems of the system and apparatus of U.S. Pat. No. 3,021,521, and in addition allows for the simultaneous transmit and receive operation as that of the present invention.

Although the system of U.S. Pat. No. 4,968,967 is believed to solve many problems and allows simultaneous transmit and receive operations, it incorporates no amplifier in the path between the antenna and receiver. Any losses between the antenna and the receiver (or first low noise amplification device) directly degrade sensitivity by adding thermal noise proportional to the losses directly into the receiver. In addition to the path losses (such as transmission lines or losses in the coupler), the coupler directly introduces noise into the receiver from the cancellation path and the terminated port of the coupler.

Thus, there is a need, therefore, to provide a radar system, and in particular a duplexer therefore, which provides simultaneous transmit and receive capability with greater sensitivity of operation then existing radar systems which provide for simultaneous transmit and receive feature.

BRIEF SUMMARY OF THE INVENTION

The present invention is a radar system having an enhanced duplexer which is a combination of high dynamic range (HDR) amplifiers and a signal cancellation circuit topology. The main transmit signal is fed into a conventional circulator, which separates the transmit and receive paths. Return signals from the antenna pass through the circulator and are fed into a first HDR amplifier. A portion of the transmit signal is sampled with a directional coupler and amplified with a second HDR amplifier and then combined with the output of the first HDR amplifier using a second directional coupler. The gain of the second amplifier is adjusted so the leakage signals are canceled.

Another aspect of the present invention is the presence of a HDR low noise (LN) amplifier between the circulator and the associated directional coupler in the receive path to enable greater sensitivity of operation, and in addition will result in reduced AM/PM sideband residue from the transmit signal.

Furthermore, where the enhanced duplexer is used in a multiplicity of sites for the antenna elements of a phased array antenna, it is possible to use a wider range of amplifier types for the duplexer having less stringent requirements on the dynamic range performance.

Another aspect of the present invention is to provide amplification in both the main and cancellation paths, together with a trimming circuit that can be placed following either amplifier or split between the two amplifiers.

Still another feature of the invention is to use amplifiers having less stringent requirements on the dynamic range performance, such as amplifiers using gallium arsenide PHEMTs (pseudo-morphic enhanced mobility transistors), bipolar, heterostructure bipolar (HBT) transistors, as the active device.

A further feature of the invention is to use a pair of amplifiers that can readily be designed to track each other in delay characteristics, either by using identical amplifiers in each location or by using similar construction. A fixed path length can be obtained so that the only trim required is amplitude (gain) adjustment of the cancellation path. A tuner can also be placed between the circulator and the antenna element to reduce the leakage signal that is reflected from the antenna.

BRIEF DESCRIPTION OF THE SEVERAL VIEWS OF THE DRAWINGS

The invention is further described with reference to the accompanying drawings wherein.

Similar numbers refer to similar parts throughout the specification.

DETAILED DESCRIPTION OF THE INVENTION

Up until now the technological challenges of the antenna port duplexer have precluded useful implementations of simultaneous transmit and receive functions for radar applications. Leakage of the transmit signal through the circulator isolation path and from the antenna reflections and mutual coupling paths tends to overload the first amplifier stage in the receive path. In accordance with the present invention, the combination of a pair of high dynamic range, low noise amplifiers, with a novel circuit topology that adaptively cancels leakage signals, provides a solution to this critical problem.

Figure 1:
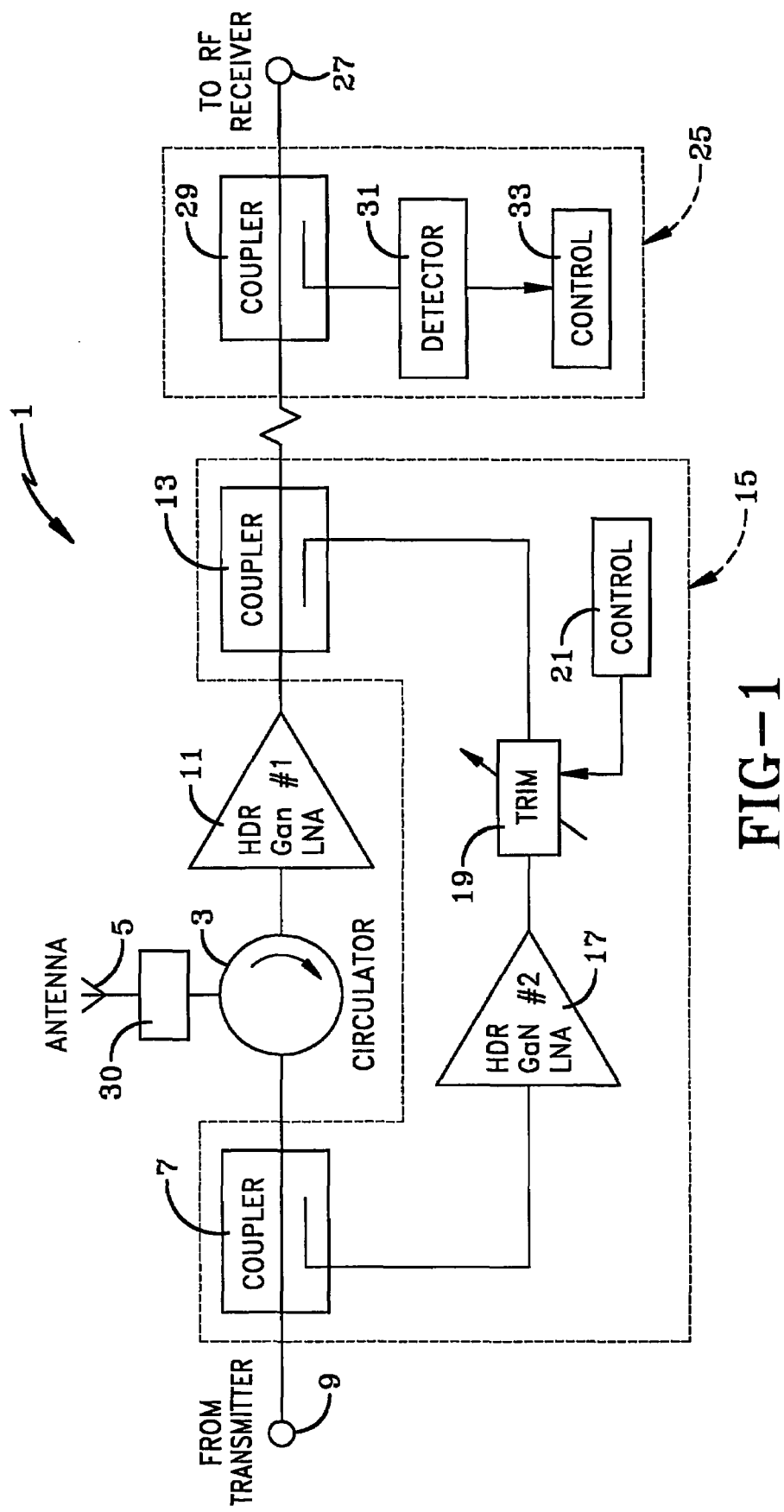
FIG. 1 is a schematic block diagram of a preferred embodiment of the present invention containing a pair of high dynamic range low noise (HDR LN) amplifiers and adaptive tuning to cancel transmitter leakage.

The adaptive duplexer circuit of the present invention is indicated generally at 1, and is shown in FIG. 1. Duplexer circuit 1 includes a usual circulator 3 which is operationally connected to an antenna 5. A first directional coupler 7 is connected in the feed path between circulator 3 and a transmitter 9. In accordance with one of the main features of the invention, a high dynamic range (HDR) low noise (LN) amplifier 11 is connected in the receive path between circulator 3 and a second directional coupler 13. A cancellation circuit, included generally at 15 and shown within the dash lines, is provided between the feed path and receive path, and in addition to directional couplers 7 and 13, include a second HDR LN amplifier 17, a phase and gain trim circuit 19 and a control circuit 21.

A calibration circuit indicated generally at 25, shown within the dash lines of FIG. 1, may be provided in the receive path between cancellation circuit 15 and receive equipment 27. Circuit 25 preferably includes a third directional coupler 29, a detector 31 and a control circuit 33, all of which are standard components well-known to those skilled in radar systems, as well as the intended use and features thereof.

In further accordance with another feature of the invention, in addition to placing amplifier 11 in the receive path, is that amplifier 11 preferably is a gallium nitride (GaN) amplifier. This may also include, but is not limited to amplifiers using gallium arsenide PHEMTs (pseudo-morphic enhanced mobility transistors), bipolar, heterostructure bipolar (HBT) transistors, as the active device. The individual performance parameters of these devices are determined on a case-by-case basis, but become possible due to the reduced amount of transmit power for each of the individual antenna elements when used in a phased array antenna.

Many of the advantages and features of the subject duplexer to enable simultaneous transmit and receive of radar signals are shown and discussed in U.S. Pat. No. 4,968,967, the contents of which are incorporated herein by reference.

Broadly, the operation of the duplexer of the present invention is as follows. The main signal path goes through circulator 3 to the antenna element 5, and the return signal comes through the circulator to the first HDR LNA 11. Transmit leakage is greatly reduced by cancellation circuit 15. The transmit signal is sampled with directional coupler 7, amplified by amplifier 17, and reinserted into the signal path by means of directional coupler 13. The two couplers 7 and 13 provide the 180° phase shift to subtract the appropriate amplitude and phase trimmed portion of the signal from the main path. Control for the trimmer comes from a downstream detector and tuning algorithms based on the transmit composite signal and the antenna phased array configuration. Nonlinear simulations show that this configuration provides the required leakage mitigation necessary for simultaneous transmit and receive radar operation. The duplexer preferably features high dynamic range GaN LN implementations for amplifiers 11 and 17.

Over the last several years work has progressed on microwave transistors and circuits based on wide band gap semiconductors. Initial work with GaN on silicon carbide (SiC) substrates has proven the feasibility of high power amplification with excellent third order linearity at frequencies to 20 GHz and higher. Furthermore, it has been demonstrated that a minimum noise figure for a GaN/SiC transistor of 0.3 dB at 10 GHz, better than the 0.5 dB measured for a 0.15 m GaAs PHEMT device of comparable geometry. Due to the high voltage capability of GaN, there is also no need for input protection devices, which degrade linearity and noise figure.

To validate the enhanced duplexer concept of the present invention, a preliminary design was simulated, complete with critical nonlinear effects. Conservative parameter values were used to assure robustness of results. For HDR LN amplifier 11, NF/P1dB/OIP3/OIP2=2 (dB) /28/38/42 (dBm). HDR LN amplifier 17 needs to be about 6 times larger, and noise figure is not critical. For the circulator Loss/Isolation=0.75/15 dB, values that are commercially available for miniaturized packages over 7-11 GHz. The 10 dB directional couplers 7 and 13 preferably are single section coupled lines. The required trimming in the cancellation circuit 15 can be accomplished with a simple phase shifter and variable attenuator of <6 dB range. Values were chosen to provide 10 dB gain and a 4 dB or better noise figure for radar return signals.

Figure 2:
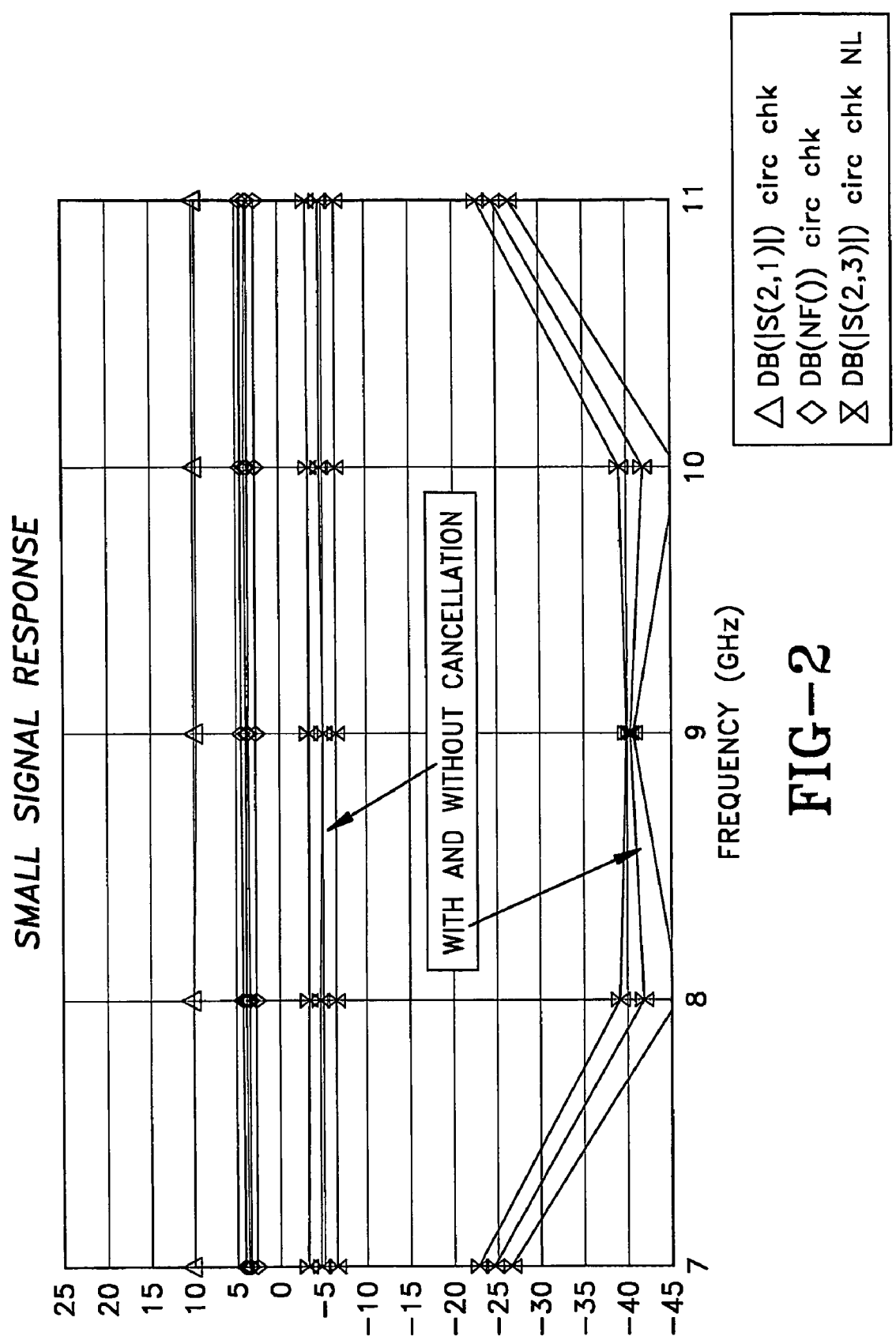
FIG. 2 is a graph showing the transmitter leakage being decreased by more than 30 dB by the duplexer of FIG. 1.

The small signal response shown in FIG. 2 is calculated first with the cancellation circuit 15 turned off, and again with it turned on. Antenna port reflections were set to a matched condition and to two conditions of −16 dB (worst case unmatched). Without cancellation, the transmit leakage signal is only suppressed 5 dB due to the circulator isolation and amplifier gain. With cancellation, 40 dB of suppression can readily be obtained. Nonlinear simulations were made for the case of two equal transmit tones. The input power was then swept from 0 dBm to +40 dBm to show the nonlinear effects. Those skilled in the art will note that the peak power for this case is 6 dB higher than for the single tone case.

Figure 3:
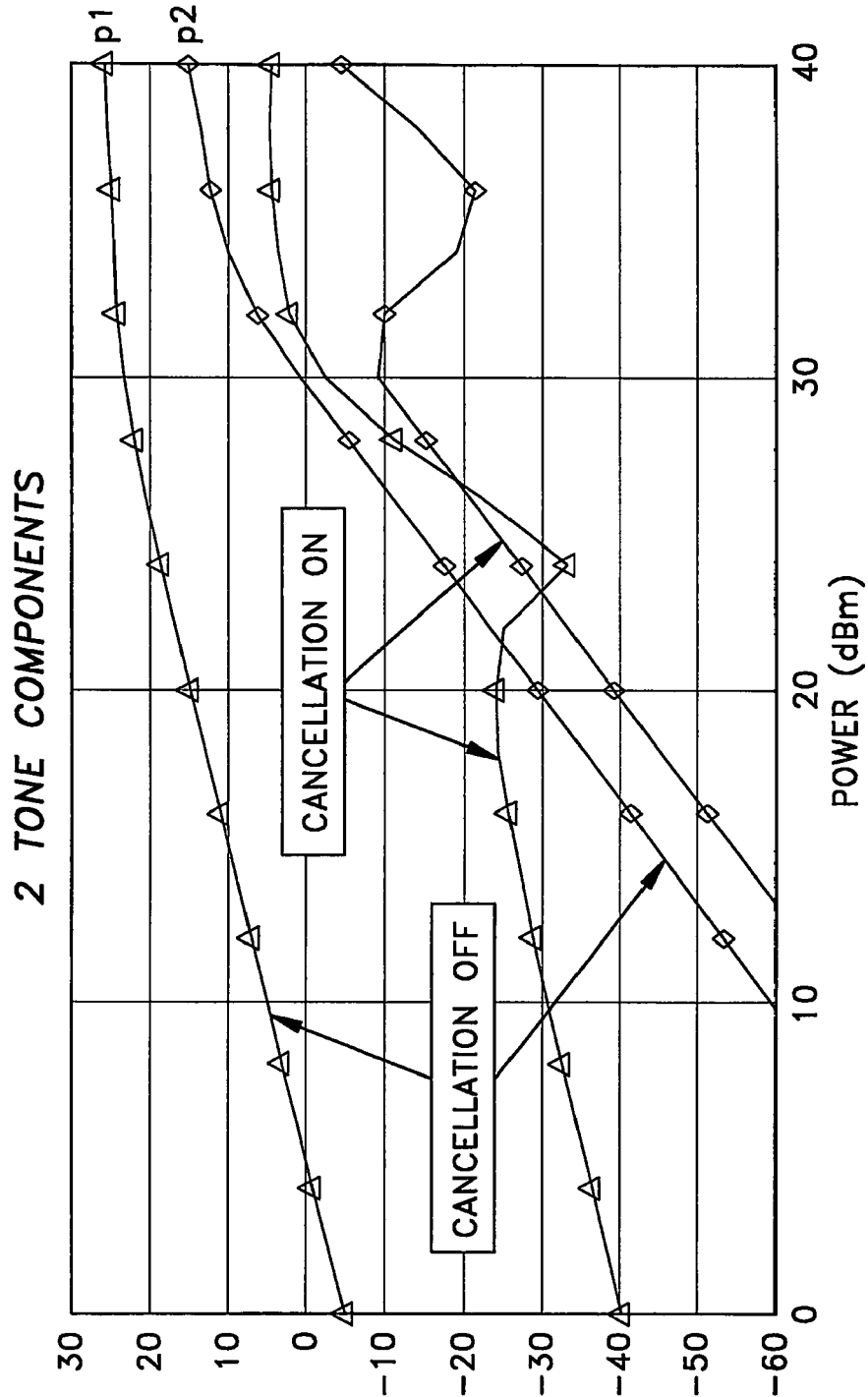
FIG. 3 is a graph showing that the cancellation circuit suppresses both fundamental tones and in band intermodulation products.

FIG. 3 shows the nonlinear behavior of the cancellation circuit. For the given parameters the transmit leakage is suppressed by 30 dB up to 30 dBm per input tone. Third order intermodulation products are also partially canceled by the duplexer of the present invention.

Referring to FIG. 2, it will be seen that duplexer transmission leakage decreased by more than 30 dB. Referring to FIG. 3, it will be seen that cancellation circuit suppresses both fundamental tones and in band intermodulation products.

Figure 4:
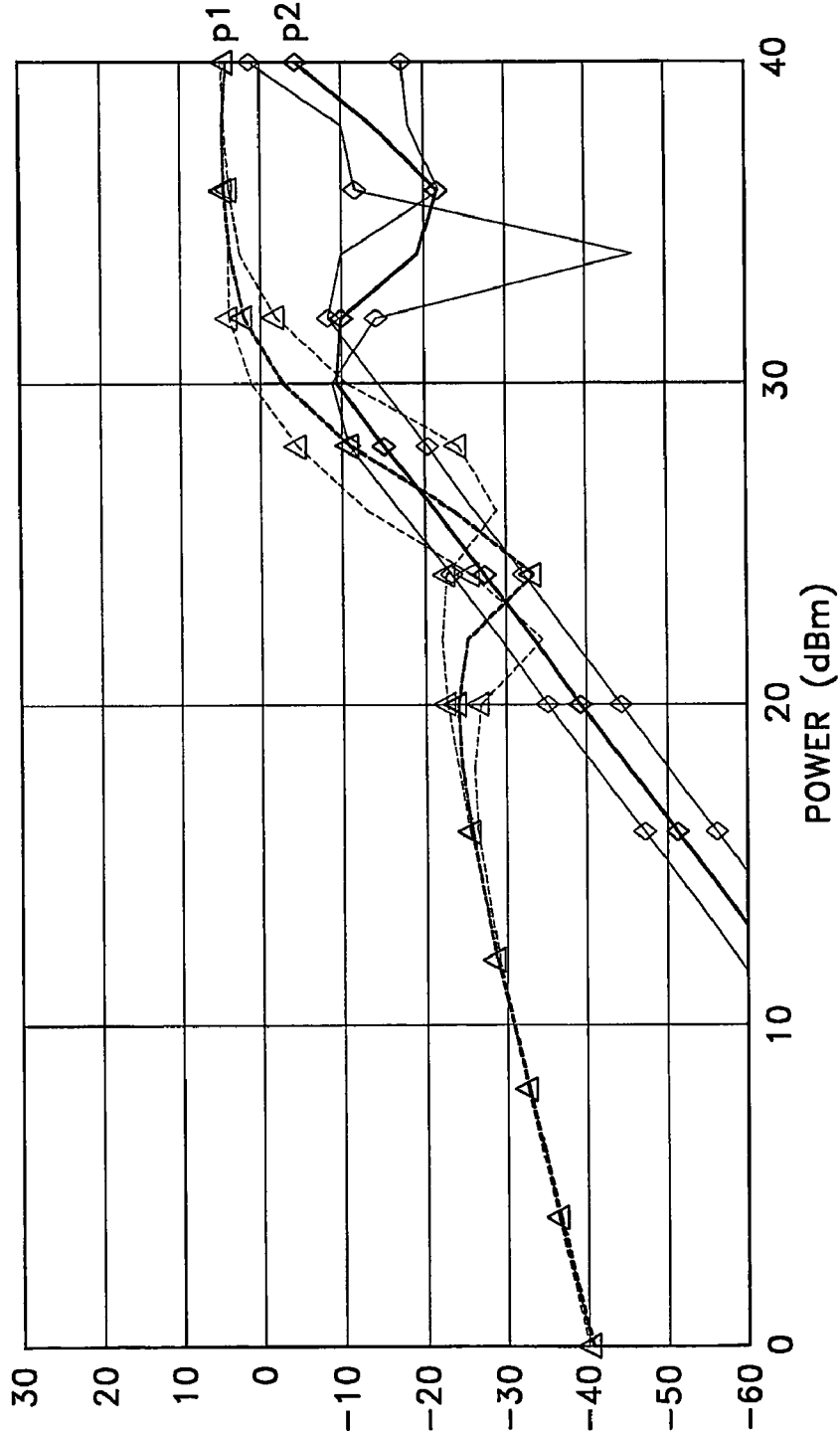
FIGS. 4 and 5 are graphs showing that the duplexer circuit of the present invention cancels worst case antenna port returns over worst case amplitude and all phases.
Figure 5:
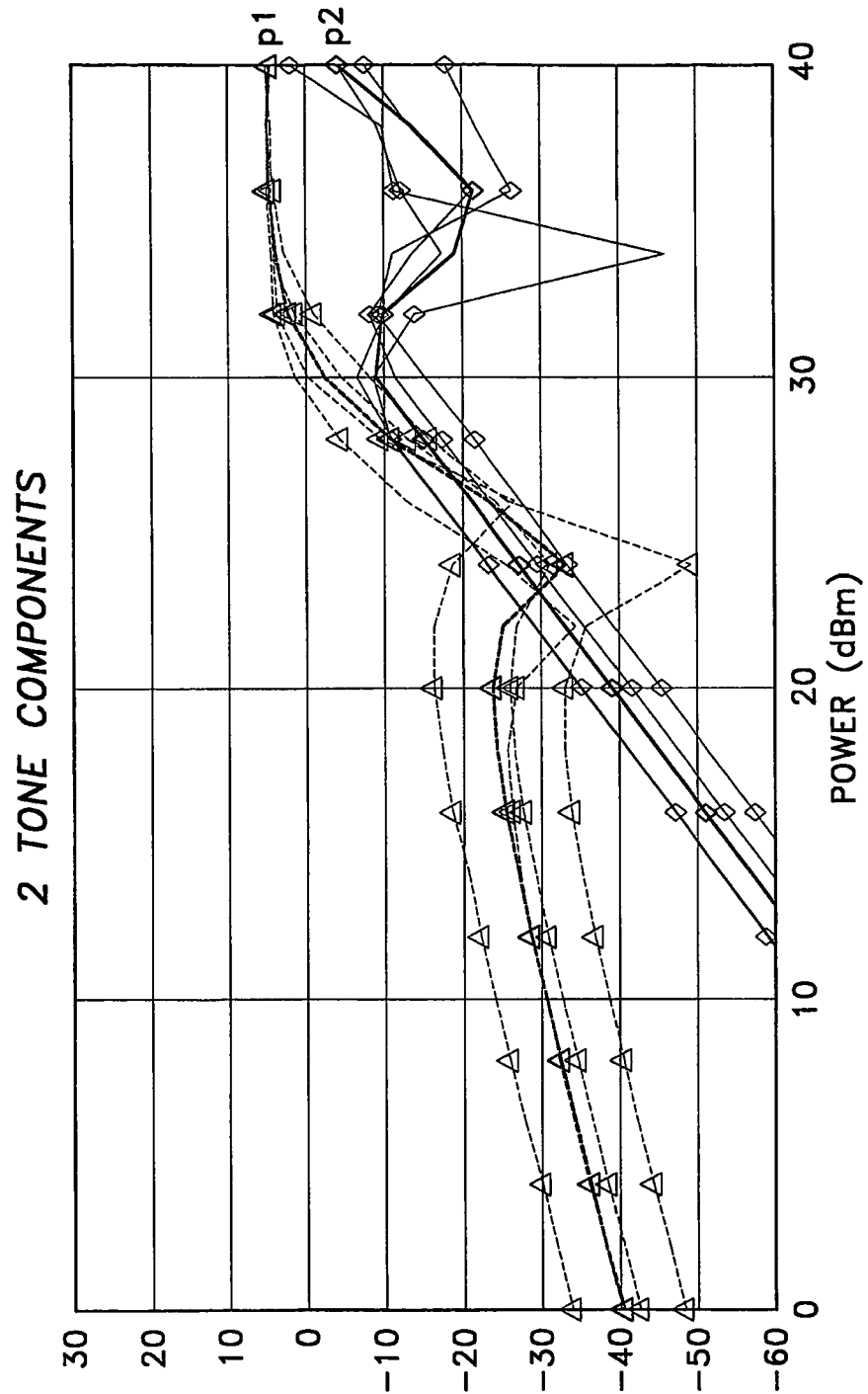

The ability of the duplexer to operate over a full range of signal returns from the antenna port is verified by the results in FIGS. 4 and 5. The graph of FIG. 4 shows fundamental and third order tones for in-phase and anti-phase returns. The graph of FIG. 5 adds a full range of phases for the worst case return, with manually tuned phase compensation in the cancellation path. All cases examined have sufficient transmit signal suppression. Thus, FIGS. 4 and 5 show that the duplexer cancels worst case antenna port returns over worst case amplitude and all phases.

If desired, a tuner 30 can be placed between circulator 3 and antenna 5 as shown in FIG. 1, in order to reduce the leakage caused by signal reflections at the antenna. Tuner 30 can be fixed or interactively controlled without affecting the concept and results achieved thereby.

Also, in accordance with the invention, trim 19 and control circuit 21 need not be located at the preferred position as shown in FIG. 1, but could be located adjacent either amplifier 11 or 17 or split between these amplifiers.

It is also possible to achieve the desired results by eliminating trim 19 and control 21 and providing a "fixed" type of circuitry by accurately designing amplifiers 11 and 17 and the lengths of the various lines (unnumbered) connecting the various components as shown in FIG. 1 whereby the phase and delay characteristics mutually track each other. However, a readily controllable and adjustable circuit as shown in FIG. 1 containing a trim circuit is preferred.

Up until now the technological challenges of the antenna port duplexer have precluded useful implementations of simultaneous transmit and receive functions for radar applications. Leakage of the transmit signal through the circulator isolation path and from the antenna reflections and mutual coupling paths tends to overload the first amplifier stage in the receive path. The combination of gallium nitride, or other suitable, wide band gap semiconductor high dynamic range, low noise amplifiers with a novel circuit topology that adaptively cancels leakage signals, as described above, provides a solution to this critical problem. The duplexer of the present invention is intended to enable operation where the receiver operates while the transmitter is emitting power, even at the same frequency as the transmitter. Actual performance parameters for components within the duplexer required for successful operation, depend on a number of factors such as required transmit power and the signal to interference (unwanted signals including clutter and transmitter leakage) ratio for proper operation of a particular radar mode.

In summary, the primary difference of the present invention in comparison to that of U.S. Pat. No. 4,986,967 is the presence of a high dynamic range low noise amplifier 11 between the circulator and the coupler in the receive path. This directly enables a greater sensitivity of operation. Any losses between the antenna and the receiver (or first low noise amplification device) directly degrade sensitivity by adding thermal noise proportional to the losses directly into the receiver. The effect of these losses is immediately alleviated in the signal path following a low noise amplifier. In addition to the path losses (such as transmission lines or losses in the coupler), the coupler directly introduces noise into the receiver from the cancellation path and the terminated port of the coupler. Therefore the duplexer circuit of the present invention is believed to have considerable better sensitivity than that of the U.S. Pat. No. 4,986,967. In a like manner there will be reduced AM/PM sideband residue from the transmit signal.

When the present invention is used in a multiplicity of sites for the antenna elements of a phased array antenna, it is possible to use a wider range of amplifier types for the duplexer, these amplifiers having less stringent requirements on the dynamic range performance. These may include, but are not limited to amplifiers using gallium arsenide PHEMTs (pseudo-morphic enhanced mobility transistors), bipolar, heterostructure bipolar (HBT) transistors, as the active device. The individual performance parameters must be determined on a case-by-case basis, but become possible due to the reduced amount of transmit power for each of the individual antenna elements.

Another advantage of the enhanced duplexer is that when the antenna is sufficiently well matched, the reflected signal is minimized, and the trim circuit can be simplified beyond what is believed possible in the known prior art apparatus of U.S. Pat. No. 4,968,967. The modulator of this apparatus is required to equalize both amplitude and phase (or delay) of the leakage signals. The duplexer of the present invention has similar components in both the main and cancellation paths. In particular amplifier 11 and amplifier 17 can readily be designed to track each other in delay characteristics, either by using identical amplifiers in each location or by using similar construction. In this case a fixed path length can be obtained so that the only trim required is amplitude (gain) adjustment of the cancellation path. In this incarnation, a tuner can be placed between the circulator and the antenna element to accomplish this degree of match. It will not be necessary in all cases because duplexer 1 has amplification in both the main and cancellation paths, the trimming can be placed following either amplifier or split between the two amplifiers. This is not believed possible in implementation of the prior art apparatus because of the large amount of signal loss (and reduced sensitivity) that the modulator would induce. For instance, in duplexer 1 the phase/delay trim could be placed in the path behind amplifier 11 and the amplitude/gain trim behind amplifier 17. Other combinations are also possible.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. A method for simultaneously transmitting and receiving signals to and from an antenna of a radar system comprising the steps of:
   feeding a main transmit signal to the antenna through a circulator;
   feeding return signals from the antenna through the circulator to a first high dynamic range (HDR) amplifier;
   sampling a portion of the transmit signal;
   amplifying said sampled signal portion with a second HDR amplifier;
   modifying said sampled signal portion by adjusting the gain and phase of the second HDR amplifier; and
   combining the modified sampled signal portion with the amplified signal from the first HDR amplifier to cancel leakage signals generated by the radar system.

2. The method defined in claim 1 including the step of providing a calibration circuit for adjusting the return signal after the leakage signals have been cancelled therefrom.

3. The method defined in claim 1 including the step of forming at least one of the first and second HDR amplifiers as a gallium nitride (GaN) amplifier.

4. The method defined in claim 1 including the step of placing a tuner between the circulator and antenna to reduce the leakage caused by signal reflections at the antenna.

5. The method defined in claim 1 including the step of adjusting the gain of the first HDR amplifier in order to aid in cancellation of the leakage signals.

6. A method for operating a duplexer comprising the steps of:
   feeding a main transmit signal into a circulator which separates said signal into a transmit signal and a receive signal;
   obtaining return signals from the circulator and feeding said return signals to a first high dynamic range (HDR) amplifier;
   sampling a portion of a transmit signal and amplifying said signal with a second high dynamic range amplifier and combining said transmit signal with the output of the first HDR amplifier;
   providing the first and second HDR amplifiers to have phase and gain characteristics that mutually track each other; and
   adjusting the gain of the second HDR amplifier so that leakage signals are canceled or minimized to acceptable performance levels.

7. The method defined in claim 6 including the step of adjusting the gain of the first HDR amplifier in order to aid in cancellation of the leakage signals.

8. The method defined in claim 6 including the step of placing a tuner between the circulator and antenna, in order to reduce the leakage caused by signal reflections at the antenna.

9. An enhanced duplexer enabling an antenna to simultaneously transmit and receive a signal, said duplexer comprising:

a circulator communicating with a transmit feed path and a receive path, said receive path containing a first HDR amplifier;

a cancellation circuit operatively connected between the transmit path and receiver path of the circulator for canceling leakage signals; said cancellation circuit including:

a second HDR amplifier for receiving return signals from the circulator;

a first coupler connected to the output of the first HDR amplifier;

a second coupler connected between the transmit path and the circulator for sampling a portion of a transmit signal;

said second HDR amplifier operatively coupled between the first and second couplers; and a phase and gain trim circuit for adjusting the gain and phase of the second HDR amplifier to cancel the leakage signals.

10. The duplexer defined in claim 9 wherein at least one of the first and second HDR amplifiers is a gallium nitride (GaN) amplifier.

11. The duplexer defined in claim 9 including a tuner operatively connected between the antenna and circulator.

12. The duplexer defined in claim 9 wherein the trim circuit is operatively connected between the second HDR amplifier and the first coupler.

13. The duplexer defined in claim 9 wherein the trim circuit is operatively connected between the first HDR amplifier and the second coupler.

14. The duplexer defined in claim 9 including a calibration circuit operatively coupled to the return signal.

15. The duplexer defined in claim 14 wherein the calibration circuit includes a third coupler, a detector and a control circuit.

16. The duplexer defined in claim 9 wherein the first and second amplifiers are low noise amplifiers.

* * * * *